Dec. 6, 1938.  G. A. GILLEN  2,139,012
ELECTRICAL MACHINE
Filed Nov. 25, 1936  2 Sheets-Sheet 1
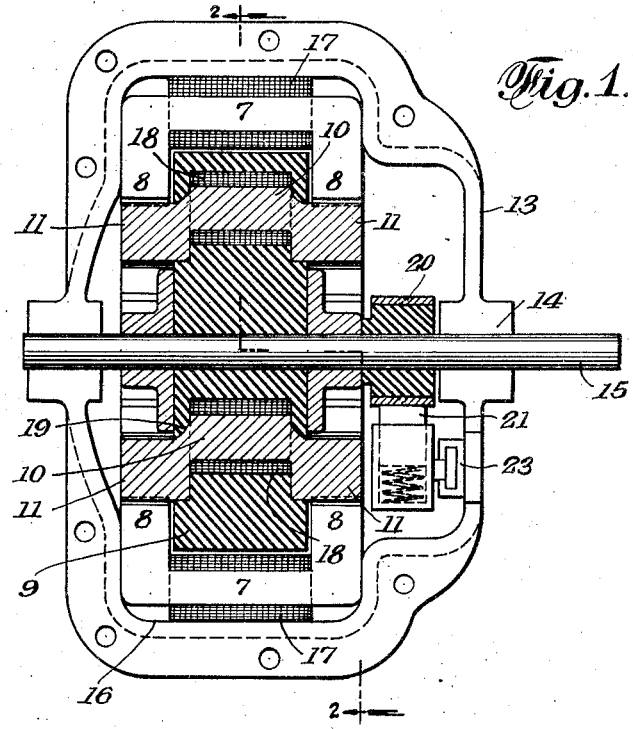
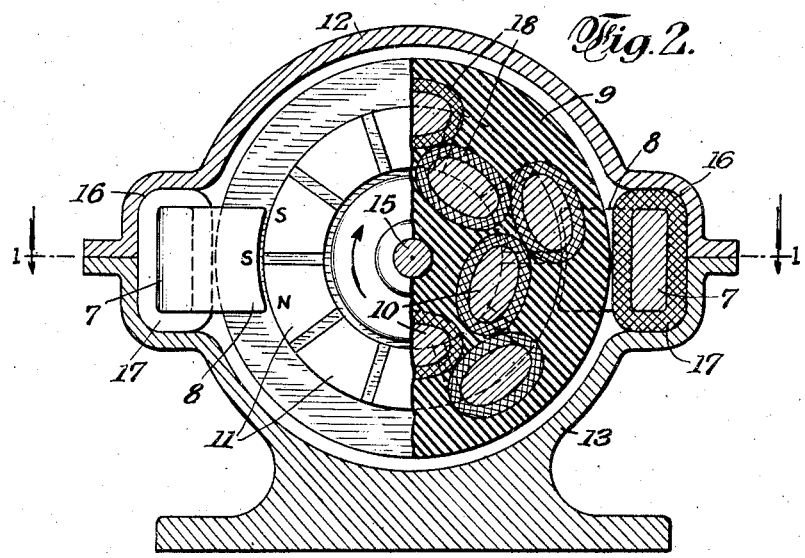
GEORGE A. GILLEN
INVENTOR
BY *Philip S. McLean*
ATTORNEY Dec. 6, 1938.  G. A. GILLEN  2,139,012
ELECTRICAL MACHINE
Filed Nov. 25, 1936  2 Sheets-Sheet 2
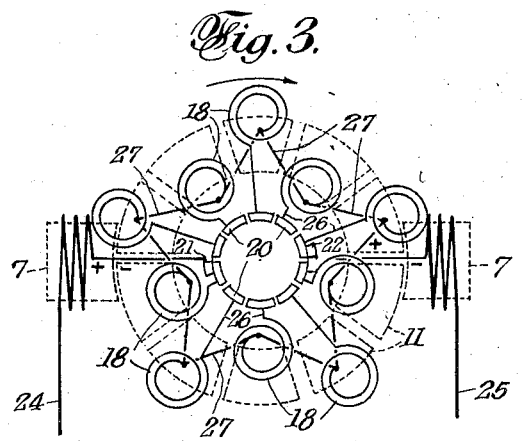
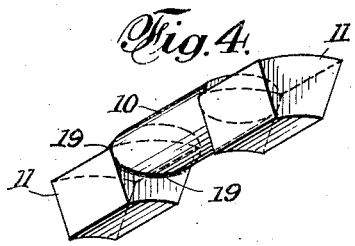
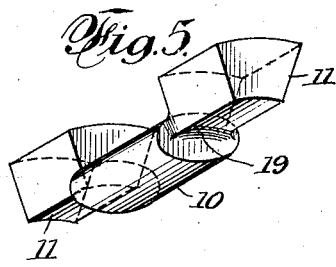
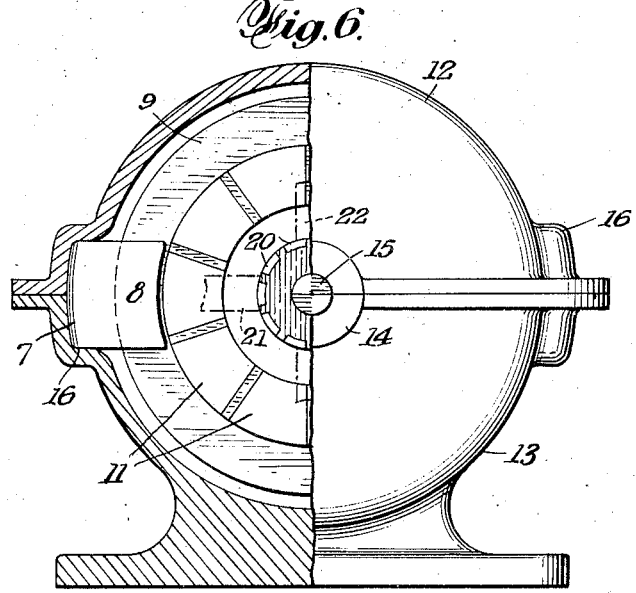
GEORGE A. GILLEN
INVENTOR
BY
ATTORNEY Patented Dec. 6, 1938

2,139,012

UNITED STATES PATENT OFFICE 2,139,012

ELECTRICAL MACHINE

George A. Gillen, New York, N. Y.

Application November 25, 1936, Serial No. 112,625

9 Claims. (Cl. 172—36)

The invention herein disclosed relates to electrical machines in the nature of motors and generators.

Special objects of the invention are to provide a machine of small compact design, simple and practical construction and high efficiency.

Additional objects and the novel features of construction by which all objects are attained will appear and are set forth in the following specification.

The drawings accompanying and forming part of the specification illustrate certain practical embodiments of the invention, but it is to be understood that the structure may be varied and changed in many ways, all within the true intent and broad scope of the invention as hereinafter defined and broadly claimed.

Figures 1 and 2 are horizontal sectional and broken vertical sectional views of one form of the invention, Figure 1 appearing as on substantially the plane of line 1—1 of Figure 2 and Figure 2 being taken as on substantially the plane of line 2—2 of Figure 1.

Figure 3 is a diagrammatic view illustrating the wiring for this form of the invention.

Figures 4 and 5 are perspective views of the two forms of magnet cores and pole pieces.

Figure 6 is a broken part sectional view of a modification in which the field electromagnets are replaced by permanent magnets.

In both forms of the invention illustrated the stator consists of a pair of diametrically opposed U-shaped field magnets 7 with the ends of the same extending inwardly and terminating in arcuate pole pieces 8, and the rotor consists of an insulating body 9 rotating between the arms of the field magnets and having magnet cores 10 extending therethrough and terminating in exposed segmental shaped pole pieces 11 directly under the field poles 8.

In the present illustration the stator housing is split on the horizontal center of the machine and consists of the upper and lower halves or sections 12, 13, bolted or otherwise secured together and carrying bearings 14 for the rotor shaft 15.

At their meeting faces the sections of the housing are shown as complementally recessed at 16 to receive and secure the field magnets.

In the first form of the invention shown in Figures 1 and 2, the field magnets are electromagnets and are therefore provided with energizing coils 17.

In the second form of the invention shown, the field magnets are permanent magnets, requiring no windings.

As indicated in Figures 2 and 6, the seats 16 for the field magnets are of proper size and shape to receive and hold the field magnets, whether they be of the electromagnetic or permanent magnet type.

By making the polar tips 11 of the rotor magnets in the form of radial segments with convexly curved outer faces opposed to the concavely curved pole pieces of the field magnets, Figures 2 and 6, the magnetic gaps may be kept at a minimum and the maximum attraction and repulsion effects be attained.

The energizing windings for the rotor magnets are indicated at 18. To get these within a rotor of small dimensions, these coils are successively offset at different radial distances from the center, as indicated in Figures 2 and 3. This is accomplished, as shown in Figures 4 and 5, by making the magnet cores in two different forms, the first form, Figure 4, with the intermediate core portion 10 offset radially outwardly, and the second form, Figure 5, with the intermediate core portions 10 offset radially inwardly of the end pole pieces 11, which latter in the final assembly are in circular relation at opposite sides of the rotor disc.

The intermediate core portions 10 are shown as elliptical in cross section, to more nearly approximate the cross sectional shape of the pole segments and to maintain the magnetic conduction as nearly uniform as possible, the core portions 10 may be joined with the pole pieces by fillets 19, increasing the cross section at such points sufficiently to prevent undesirable restriction of the magnetic flow.

Reversal of polarity is effected in the illustration by a commutator shown as consisting of insulated segments 20 connected with the rotor windings, Figure 3, and engaged by brushes 21, 22, connected in an external circuit, which in the case of a motor might be an electric service line. In the full electromagnetic form of the machine, Figures 2 and 3, the field coils 17 would be included in this brush circuit. A simple form of brush support is indicated at 23, Figure 1, but the form and location of the brush supports may vary according to the positioning of the brushes for proper commutation. Figure 6 illustrates in dotted lines how there may be more than two brushes and how they may be located in different angular relations.

In the simplified wiring diagram, the field coils 17 are connected with the two sides 24, 25 of the line and with the brushes 21, 22. The coils of the rotor, have individual connections 26 with the commutator segments and a common connection 27 is provided between all the coils so as to attain the effect indicated in Figure 2 of attraction and repulsion as between the arcuate rotor poles 11 and the field poles 8.

The constructions disclosed are simple and inexpensive to manufacture and assemble. The disc-like body of the rotor may be of synthetic resin or like material, molded about the rotor magnets, holding them fixed in proper relation. The stator may be assembled by simply placing the field magnets in their seats in the lower section of the casing and then securing the top or cover section in place.

Four or more field magnets may be provided instead of simply two, as shown. Both the bar magnets of the rotor and the U magnets of the stator may be laminated. The offset intermediate portions of the bar magnets serve to position and hold the coils in place thereon. The particular relation disclosed provides a full magnetic circiut of low resistance, resulting in high starting torque and smooth powerful operation in a small size construction. Reversal may be effected at full speed, without injurious effects and, because of the common connection, the machine may be continued in operation even though one or more of the rotor coils be burned out or shortcircuited. The machine is adapted for either A. C. or D. C. operation.

With connections as indicated in Fig. 3, it will be seen that the armature magnets will be consecutively energized as they approach the field magnet poles and in a manner to effect attraction between both ends of the armature magnets and the field poles which they are approaching.

I claim:

1. An electrical machine of the character disclosed comprising a rotor, bar magnets carried by said rotor and having segmental poles with arcuate outer faces in circular arrangement at the opposite sides of said rotor and a stator having U-shaped field magnets bridging said rotor and having arcuately curved poles overstanding the curved outer faces of said polar segments on the rotor.

2. An electrical machine of the character disclosed comprising a rotor, bar magnets carried by said rotor and having segmental poles with arcuate outer faces in circular arrangement at the opposite sides of said rotor and a stator having U-shaped field magnets bridging said rotor and having arcuately curved poles overstanding the curved outer faces of said polar segments on the rotor, said bar magnets of the rotor having elliptical cross section approximating the shape of the segmental polar extensions.

3. An electrical machine of the character disclosed comprising a rotor, bar magnets carried by said rotor and having segmental poles with arcuate outer faces in circular arrangement at the opposite sides of said rotor, a stator having U-shaped field magnets bridging said rotor and having arcuately curved poles overstanding the curved outer faces of said polar segments on the rotor, the successive bar magnets having inwardly and outwardly offset intermediate core portions and energizing coils on said offset intermediate core portions.

4. An electrical machine of the character disclosed comprising a rotor, bar magnets carried by said rotor and having segmental poles with arcuate outer faces in circular arrangement at the opposite sides of said rotor, a stator having U-shaped field magnets bridging said rotor and having arcuately curved poles overstanding the curved outer faces of said polar segments on the rotor, energizing coils on the intermediate portions of said bar magnets and commutator means connected with said coils.

5. An electrical machine of the character disclosed comprising a rotor, bar magnets carried by said rotor and having segmental poles with arcuate outer faces in circular arrangement at the opposite sides of said rotor, a stator having U-shaped field magnets bridging said rotor and having arcuately curved poles overstanding the curved outer faces of said polar segments on the rotor, energizing coils on the intermediate portions of said bar magnets, energizing coils on said U-shaped field magnets, and commutator means connected with said coils.

6. An electrical machine of the character disclosed comprising a rotor, bar magnets carried by said rotor and having segmental poles with arcuate outer faces in circular arrangement at the opposite sides of said rotor, a stator having U-shaped field magnets bridging said rotor and having arcuately curved poles overstanding the curved outer faces of said polar segments on the rotor and a split stator casing rotatably supporting said rotor and provided with seats for receiving, positioning and holding said field magnets.

7. An electrical machine comprising diametrically opposed U-shaped field magnets having inwardly extending concavely curved poles, a rotor journaled to turn between the arms of said U-magnets, bar magnets carried by said rotor and having segmental poles with convexly curved outer faces in circular arrangement and opposed to said concavely curved field poles, energizing coils for said rotor magnets and commutating means connected with said coils.

8. An electrical machine of the character disclosed comprising a rotor, bar magnets having circularly arranged poles at the opposite faces of said rotor and intermediate core portions in radially offset relation, magnet windings on said radially offset core portions and field magnets disposed for cooperation with said circularly arranged poles.

9. An electrical machine of the character disclosed, comprising a rotor, bar magnets carried by said rotor and having segmental poles with arcuate outer faces in circular arrangement at the opposite ends of the rotor, the successive bar magnets having alternately inwardly and outwardly offset intermediate core portions, energizing coils on said alternately oppositely offset intermediate core portions, a stator having a U-shape field magnet with arcuately curved poles overstanding the arcuate outer faces of the rotor poles and commutator means connected with said energizing coils.

GEORGE A. GILLEN.